(12) United States Patent
Andrews et al.

(10) Patent No.: US 8,402,438 B1
(45) Date of Patent: Mar. 19, 2013

(54) METHOD AND SYSTEM FOR GENERATING VERIFICATION INFORMATION AND TESTS FOR SOFTWARE

(75) Inventors: Jason Robert Andrews, Ham Lake, MN (US); Markus Winterholer, Tuebingen (DE); Ronald Joseph Pluth, Devis, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1047 days.

(21) Appl. No.: 11/949,553

(22) Filed: Dec. 3, 2007

(51) Int. Cl.
*G06F 9/44* (2006.01)

(52) U.S. Cl. ........................ 717/126; 717/131

(58) Field of Classification Search .................. 717/126, 717/131
See application file for complete search history.

(56) References Cited

U.S. PATENT DOCUMENTS

| | | | |
|---|---|---|---|
| 4,802,091 A | 1/1989 | Cocke et al. | |
| 5,325,533 A | 6/1994 | Mcinerney et al. | |
| 5,452,457 A | 9/1995 | Alpert et al. | |
| 5,530,964 A | 6/1996 | Alpert et al. | |
| 5,655,073 A * | 8/1997 | Nishikado et al. | 717/124 |
| 5,774,726 A | 6/1998 | Ahmed | |
| 5,838,948 A | 11/1998 | Bunza | |
| 6,029,262 A | 2/2000 | Medd et al. | |
| 6,038,378 A | 3/2000 | Kita et al. | |
| 6,161,217 A | 12/2000 | Detlefs et al. | |
| 6,182,258 B1 | 1/2001 | Hollander | |
| 6,272,451 B1 | 8/2001 | Mason et al. | |
| 6,321,376 B1 | 11/2001 | Willis et al. | |
| 6,347,388 B1 * | 2/2002 | Hollander | 714/739 |
| 6,389,379 B1 | 5/2002 | Lin et al. | |
| 6,550,057 B1 | 4/2003 | Bowman-Amuah | |
| 6,571,373 B1 | 5/2003 | Devins et al. | |
| 6,701,490 B1 | 3/2004 | Talukdar et al. | |
| 6,842,883 B2 | 1/2005 | Whitehill | |
| 7,000,224 B1 * | 2/2006 | Osborne et al. | 717/125 |
| 7,051,303 B1 | 5/2006 | Lam et al. | |
| 7,657,877 B2 | 2/2010 | Vorbach et al. | |
| 7,681,184 B1 * | 3/2010 | Weedon et al. | 717/137 |
| 7,689,973 B2 | 3/2010 | Kwong et al. | |
| 7,702,958 B2 | 4/2010 | Kwong et al. | |
| 7,810,081 B2 | 10/2010 | Dickenson et al. | |
| 2002/0073375 A1 | 6/2002 | Hollander | |
| 2002/0120909 A1 | 8/2002 | Brouhard et al. | |
| 2004/0216023 A1 * | 10/2004 | Maoz et al. | 714/742 |
| 2004/0243984 A1 | 12/2004 | Vorbach et al. | |
| 2005/0039079 A1 | 2/2005 | Higashi et al. | |
| 2005/0165597 A1 | 7/2005 | Nightingale | |
| 2005/0246693 A1 | 11/2005 | Plum | |
| 2007/0277130 A1 | 11/2007 | Lavelle | |

(Continued)

OTHER PUBLICATIONS

Saini, et al., Co-Verification Methodology for Platform FPGAs, EE Journal (Feb. 22, 2005).*

(Continued)

*Primary Examiner* — Anna Deng
(74) *Attorney, Agent, or Firm* — Vista IP Law Group, LLP (57) ABSTRACT

Disclosed is a process, system, and computer program product for generating a verification test or verification environment for testing and verifying software or mixed software/hardware. Object code is analyzed to generate and setup test information and environments. The object code is analyzed to identify information about the software important or relevant for the verification process. Based upon the information generated from the object code, one or more verification environments or tests can be generated for testing and verifying the software or mixed hardware/software.

26 Claims, 10 Drawing Sheets

U.S. PATENT DOCUMENTS

| | | |
|---|---|---|
| 2008/0016396 A1 | 1/2008 | Higashi et al. |
| 2008/0215768 A1 | 9/2008 | Reid et al. |
| 2008/0271001 A1 | 10/2008 | Nonomura et al. |
| 2009/0125882 A1 | 5/2009 | Frigo et al. |

OTHER PUBLICATIONS

Winterholer, M., Transaction-based Hardware Software Co-verification, FDL'06 (Sep. 2006).*

Andrews, J., Coverage Driven Methodology for Verification of SoC Hardware and Software Corner Cases, 2006.

Hall, G., Hardware Software co-verification using Coverage Driven Verification Techniques, 2005.

Zwingenberger, E., Extending a coverage driven verification environment with real software, Micronas, CDNLive! EMEA, Nice, France, Jun. 25-27, 2006.

Andrews, J., Co-Verification of Hardware and Software for ARM SoC Design, Aug. 30, 2004, Newnes, pp. 1-288.

Hanford, K. V., Automatic generation of test cases, IBM Systems Journal, 1970, vol. 9, Issue 4, pp. 242-257.

Esin, A., et al., Experiments on Semantics Based Testing of a Compiler, 2008.

Zelenov, S., et al., Test Generation for Compilers and Other Formal Text Processors, Programming and Computer Software, vol. 29, No. 2, Nov. 19, 2003.

Non-Final Office Action dated Jun. 2, 2011 for U.S. Appl. No. 11/966,834.

Non-Final Office Action dated Nov. 26, 2010 for U.S. Appl. No. 12/242,491.

Final Office Action dated May 11, 2011 for U.S. Appl. No. 12/242,491.

Notice of Allowance dated Dec. 29, 2011 for U.S. Appl. No. 11/966,834.

Yoshikawa, T., Random Program Generator for Java JIT Compiler Test System, Nov. 6, 2003.

Gupta, G., Automatic Generation of Provably Correct Parallelizing Compilers, Aug. 10, 1998.

* cited by examiner

METHOD AND SYSTEM FOR GENERATING VERIFICATION INFORMATION AND TESTS FOR SOFTWARE

BACKGROUND

Essential steps for the modern software development process are the steps of testing and debugging software to ensure that the software will work and function as expected in its intended processing environment. These steps are usually implemented as methodical processes of finding and reducing the number of defects in the software program to make it behave as expected or intended. These are well-known to be cumbersome, time-consuming, and complicated tasks, and yet are in many cases performed manually with the end result very much reliant upon the individual level of skill of the programmer assigned to perform the testing and debugging tasks.

These tasks are often made much more difficult if the software program is tightly coupled to other devices or subsystems. This is because it is often difficult to determine and test the complex interactions between the software and the other subsystems and components in the overall system. Moreover, changes in one part of the system may cause unexpected results and errors to emerge in other parts the system.

Embedded software is a type of software (or firmware) that is designed to interact and interface in an integral way with a specific system or item of hardware. Designing and testing embedded software is considered to be very challenging for many designers since it normally requires a multi-disciplinary approach to systems design that must take into account multifaceted effects throughout the different parts of the system. The programmer must consider many acute constraints for a successful design, such as energy consumption, memory space, criticality and safety considerations, and execution time. With many modern systems designs becoming more and more complex, these constraints are causing greater and greater difficulties for the design and testing process.

"Verification" is the term that is often used to refer to the process of determining a design meets requirements. In practice, verification is the process of identifying and removing as many functional bugs in the hardware and software as possible. The oldest form of verification is to build it, run it, and watch what happens.

Consider the problem of designing and verifying a System-on-Chip (SoC) involving both electronic hardware design and its associated embedded software design. The design verification process should be able to sufficiently test the SoC to ensure that it will work for its intended purpose. This is a very difficult challenge to ensure that the hardware and software work together at the SoC level. Hardware verification has advanced to the point where the verification of individual functional blocks in a design can be achieved with reasonable confidence using constrained random testbenches, code coverage, assertion coverage, and functional coverage.

However, significant problems exist for conventional techniques and tools when attempting to ensure that the software blocks work correctlywhen placed in the context of the SoC, since conventional SoC verification tools do not have the facility to adequately account for and test embedded software. Unfortunately, conventional approaches for SoC verification often result in many products that have subtle problems, most of which are caused by corner cases between the hardware and software. Many of today's consumer electronics are examples of this, where they contain advanced features constructed with complex hardware and software, but suffer from periodic lock-ups or require periodic reboots. The design of products produced using conventional verification techniques will have often failed to correct conditions where the hardware and software experience functional corner cases causing failures occur.

SUMMARY

To address these problems, among others, embodiments of the present invention provide an approach in which software object code is analyzed to generate and setup test information and test environments. The object code is analyzed to identify information about the software important or relevant for the verification process. Based upon the information generated from the object code, one or more verification environments or tests can be generated for testing and verifying the software.

The invention can be used to produce higher quality designs by exposing the hidden corner cases that are not being identified by conventional verification tools. Additional stress is applied to the boundary conditions of the design, and will particularly include the embedded software in the process.

The present invention allows designers to more efficiently and accurately perform verification of embedded software. Embodiments also allow more efficient and accurate processing in co-verification tools. For example, the embodiments can be employed to improve the SoC verification process.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

The present invention provides improved approaches for generating verification information, tests and/or environments for verifying software. According to some embodiments, software object code is analyzed to generate and setup test information and environments rather than software source code. The object code is analyzed to identify information about the software important or relevant for the verification process. Based upon the information generated from the object code, one or more testbenches can be generated for testing and verifying the software. The invention can be applied to verify and debug any type of software, including embedded software programs. In addition, the invention can be applied to perform co-verification activities.

For the purposes of illustration, various embodiments of the invention will be described and explained with respect to software programs written in and having the syntax of specific programming languages, such as the C programming languages. It is noted, however, that the invention may be applied to software corresponding to any programming language, and is therefore not to be limited to any of the specific programming languages or language syntaxes described herein unless otherwise claimed.

Figure 1:
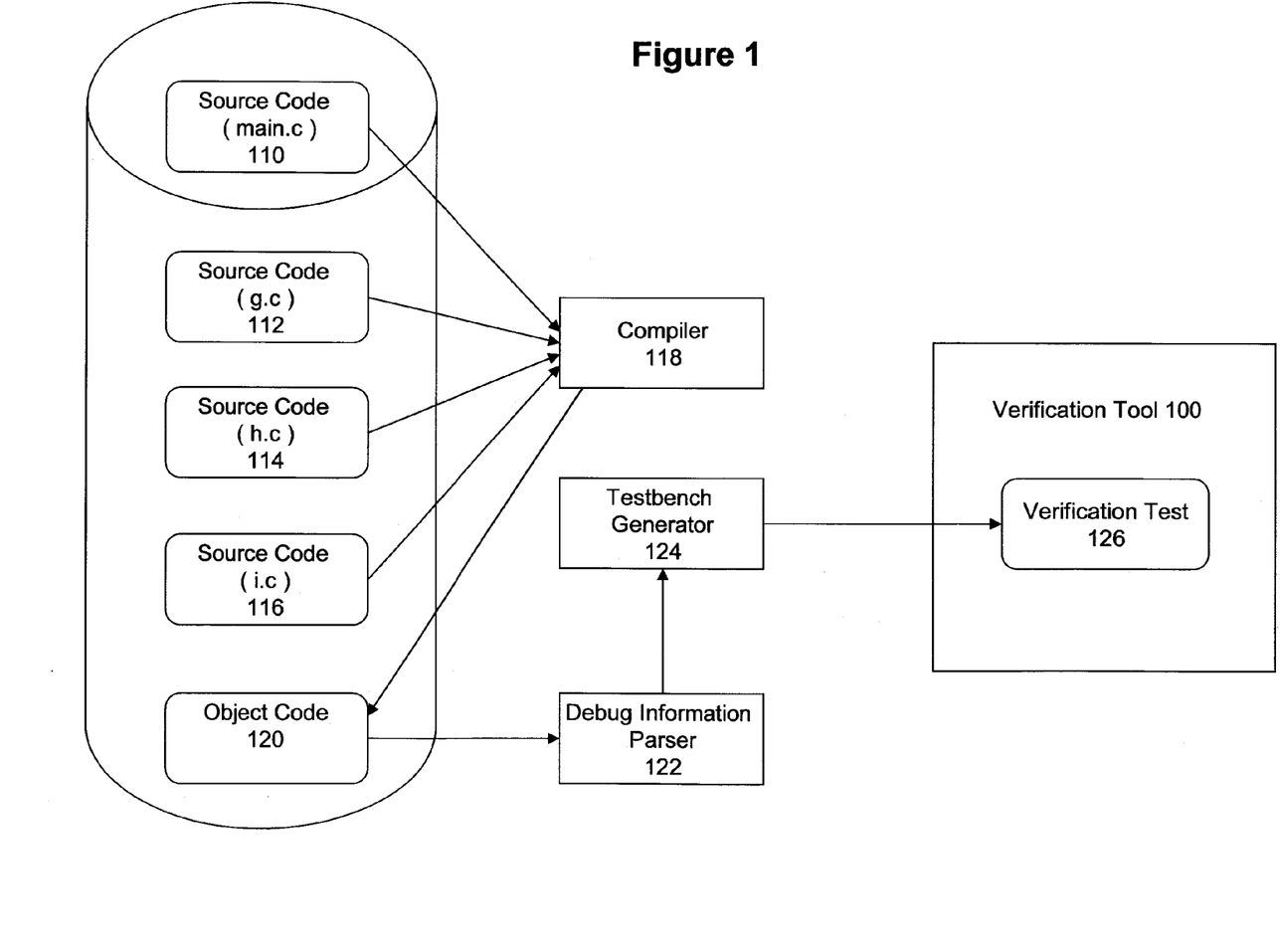
FIG. 1 shows a high-level illustration of an embodiment of the invention for generating a verification testbench for a software program.

FIG. 1 shows a high-level illustration of an embodiment of the invention for generating a verification testbench for a software program. In this figure, the example software program to be tested is shown as corresponding to four source code files 110, 112, 114, and 116. Source code file 110 corresponds to the main program portion of the software program. Source code files 112, 114, and 116 correspond to additional source code files that interact and integrate with other portions of the overall software program. A compiler 118 is employed to compile the software program into object code stored as an object file 120.

Information about the software program is extracted from the object code using a debug information parser 122, which is often implemented as part of a debugging tool. According to some embodiments, the debug information that is extracted for purposes of generating a verification test includes information about functions and variables within the software program.

A testbench generator 124 generates a verification test 126 based upon the function and variable information that has been extracted from the object code 120. A verification tool 100 utilizes the verification test 126 to verify the functionality and performance of the software program. In some embodiments, the verification test 126 comprises a verification environment having sufficient information to allow constructs within the verification tool 100 to interact and apply stimulus to the software program to perform verification and testing functions.

It is noted that the present embodiment of the invention extracts information to generate the verification test 126 from the object version 120 of the software program, as opposed to the source code version 110, 112, 114, 116 of the software program. There are numerous advantages to working from the object code version instead of the source code version of the software program. In particular, there is information about the executable for the software program that cannot be derived from the source code version, but instead can only be derived from object code version of the software program. For example, the compiler 118 will cause machine specific attributes and parameters to be applied to the object form of the software program, e.g., the number of bytes used to implement certain standard types such as the integer type may differ from machine to machine. This type of information is not accessible from the source code, but can be retrieved from the object code version of the software. In addition, it is noted that the source code files are often not available to a programmer to perform debugging activities, particularly if the programmer is using or linking from a third party library that is in object code form.

As noted above, the generated verification test 126 is used by a verification tool 100 to test and stimulate the software program. The verification tool 100 implements one or more automated verification plans containing a set of goal metrics that are used to measure progress toward verification completion. By definition of the plan(s), if these metrics are achieved, the design is verified. The process of verification planning is used to define the corner cases that need to be addressed, and the use of automated, constrained random stimulus to address these corner cases is known as Coverage Driven Verification (CDV). To perform CDV, the corner cases are converted into coverage points where the goal is to reach 100% coverage. Using random generation to reach coverage points may also result in new corner cases that engineers may not themselves have contemplated.

According to some embodiments, the term "co-verification" refers to the use of constrained random stimulus and functional coverage metrics applied to the hardware design, the embedded software, and/or the combination of hardware and software. This is in contrast to a "co-simulation" approach utilizing the connection of two simulators where one simulator executed the hardware design and another executed the software. This is also in contrast to "co-debugging", which refers to the process of starting and stopping the system and observing the state of both the hardware and the software to understand the existence of problems.

Figure 2:
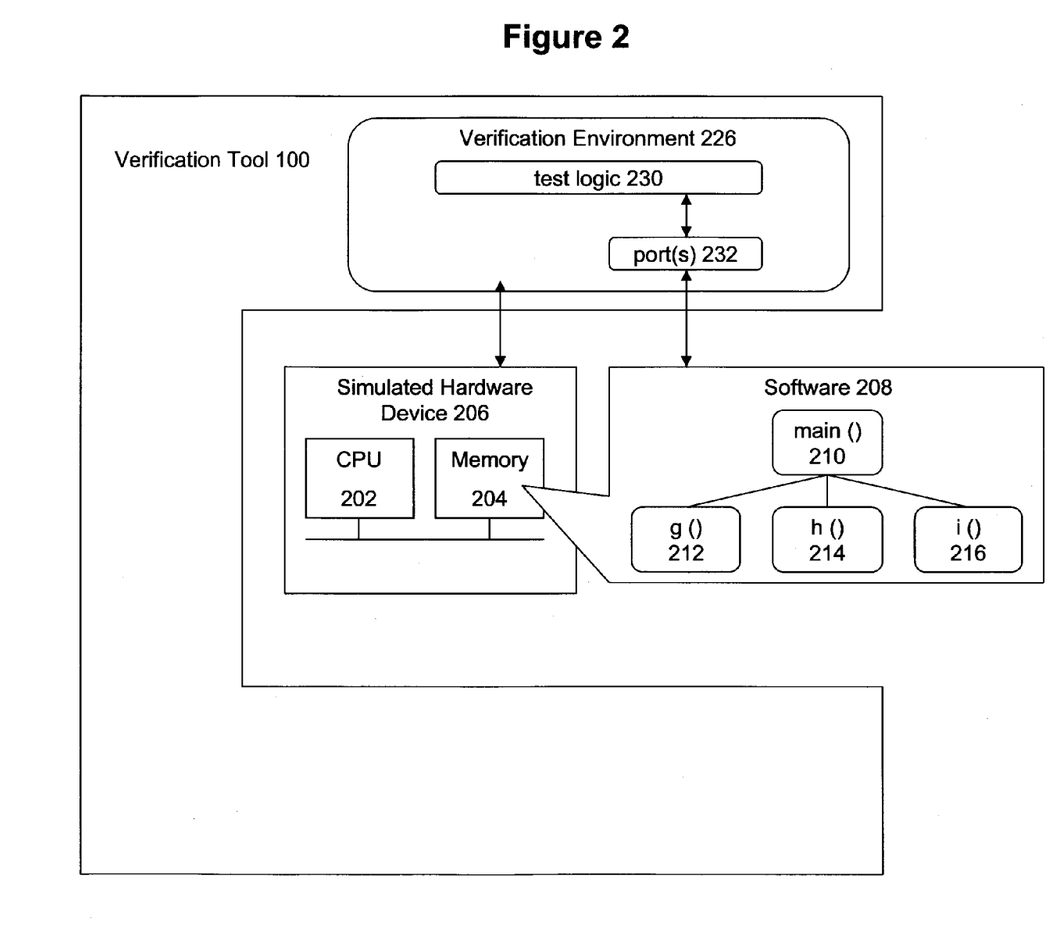
FIG. 2 illustrates a general architecture for using a verification tool 100 to implement co-verification.

FIG. 2 illustrates an architecture for using a verification tool 100 to implement co-verification. Verification tool 100 is a computer aided design (CAD) tool or electronic design automation (EDA) tool that has the capability to utilize a verification environment 226 for testing a design having hardware, software, or a combination of both hardware and software. The verification environment 226 is used to create activity that is similar to the way the overall system is expected to behave, thereby providing stimulus to actively and thoroughly test the design. The test verification environment may be implemented using test software 230 in a language specific to the test system. One or more ports 232 may be used to interface between the test software 230 and the software program 208 that is under testing.

A simulated hardware device 206 may be employed to model the design of the hardware portion of the system design. The simulated hardware device 206 generally comprises an executable model of the hardware design that can be simulated using simulation or formal verification techniques. The executable model 206 may comprise a portion to model a processor 202, memory 204, as well as other structures such as bus architectures and interconnects.

The verification tool 100 interacts with the software design 208 that is expected to be used with the hardware device 206. The software design 208 may include multiple functions, such as functions 210, 212, 214, and 216.

Any suitable verification tool can be employed in conjunction with embodiments of the invention. One example verification tool is the SPECMAN product available from Cadence Design Systems, Inc. of San Jose, Calif. The SPECMAN product has the capacity to perform coverage driven verification based upon constrained random stimulus. The SPECMAN product operates with a verification environment specified based upon the test software 230 being in the "e" programming language, which is a general purpose testbench language that can be used for either hardware or software designs. Some of the illustrative examples in this document may be explained or described in conjunction with the structure, syntax, or context of the e language and/or the SPECMAN operating environment. It is noted, however, that the invention may be applied to any suitable verification tool or environment, and is therefore not to be limited to any of the specific verification tools, programming languages, or environments described herein unless otherwise claimed. It is also noted that the invention is not limited to implementations in which the programming language of the software program being tested is different from the programming language used in the verification system. For instance, the invention may be applied if the language of the test system is the same as the language of the software being tested, but structural differences exist between the test software and the source software being tested, e.g., because different compilers are being used.

Figure 3:
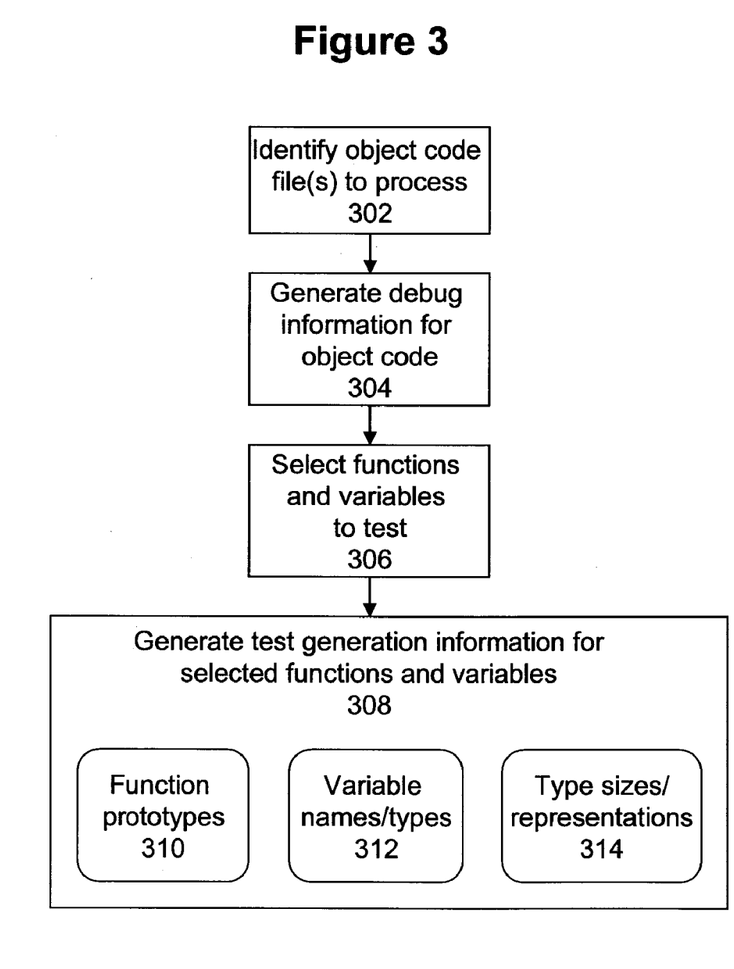
FIG. 3 shows a more detailed flowchart of a process for extracting information from one or more object code files to generate the verification test or verification environment.

FIG. 3 shows a more detailed flow of a process for extracting information from one or more object code files to generate the verification test or verification environment. At 302, identification is made of the specific object code file(s) to operate upon. This action may be performed based upon user interaction and selection. In an alternate embodiment, this action may be performed automatically by the system based upon analysis of software code, based upon past activities or selections of the user, or based upon heuristics derived from past verification testing.

It is noted that the number of object code files for a software program is often much less than the number of source code files for the program. This is because the act of compilation typically takes multiple source files as input to generally produce an object file as an output. Since the present embodiment utilizes object code files rather than source code files, a much smaller number of files must be reviewed and analyzed to perform software testing/verification. This potentially makes the process of testing and verifying software more efficient and less prone to error for identifying relevant portions of the software to test.

At 304, relevant debug information is generated based upon a review of the selected object code file(s). Any approach can be taken to access the debug information in the object code. For convenience in some embodiments, a debugging tool may be used to generate the debug information. A debugging tool or "debugger" is a software tool which enables a programmer to monitor a software program, the execution of the program, and/or resources accessed by the program. Any suitable debugging tool can be used in the context of the invention. Example debugging tools that may be used in conjunction with the invention include the "dwarfdump" tool, available at http://www.dwarfstd.org/, and the "objdump" tool, available at http://www.gnu.org/.

According to some embodiments, the debug information that is extracted for purposes of generating a verification test includes information about functions and variables within the software program. At 306, identification is made of the specific functions and variables to operate upon. This action may be performed based upon user interaction and selection. Based upon the debug information, a list of functions and variables from the software program may be presented to the user. The user can then select any or all of the functions and variables for testing. In an alternate embodiment, this action may be performed automatically by the system based upon analysis of software code, based upon past activities or selections of the user, or based upon heuristics derived from past verification testing or other analysis factors.

At 308, test generation information is produced based upon the selected functions and variables. The test generation information may include function prototypes 310, variable names and types 312, and type size and representations 314. Function prototypes refer to the semantic representations of functions and their arguments. For example, the following is a hypothetical function prototype for a channel analyzer function having integers "a" and "b" as arguments: "int channel_analyzer (int a, int b)". The information about variable names and types 312 include the names and sizes of each of the variables that have been selected for testing. The information about type size and representations 314 include type sizes and representations for the software program generated by the compiler during the process of compiling source code into analyzed object code. The type sizes and representations 314 may be machine-specific, and therefore may not be accessible from the source code versions of the software program.

Figure 4:
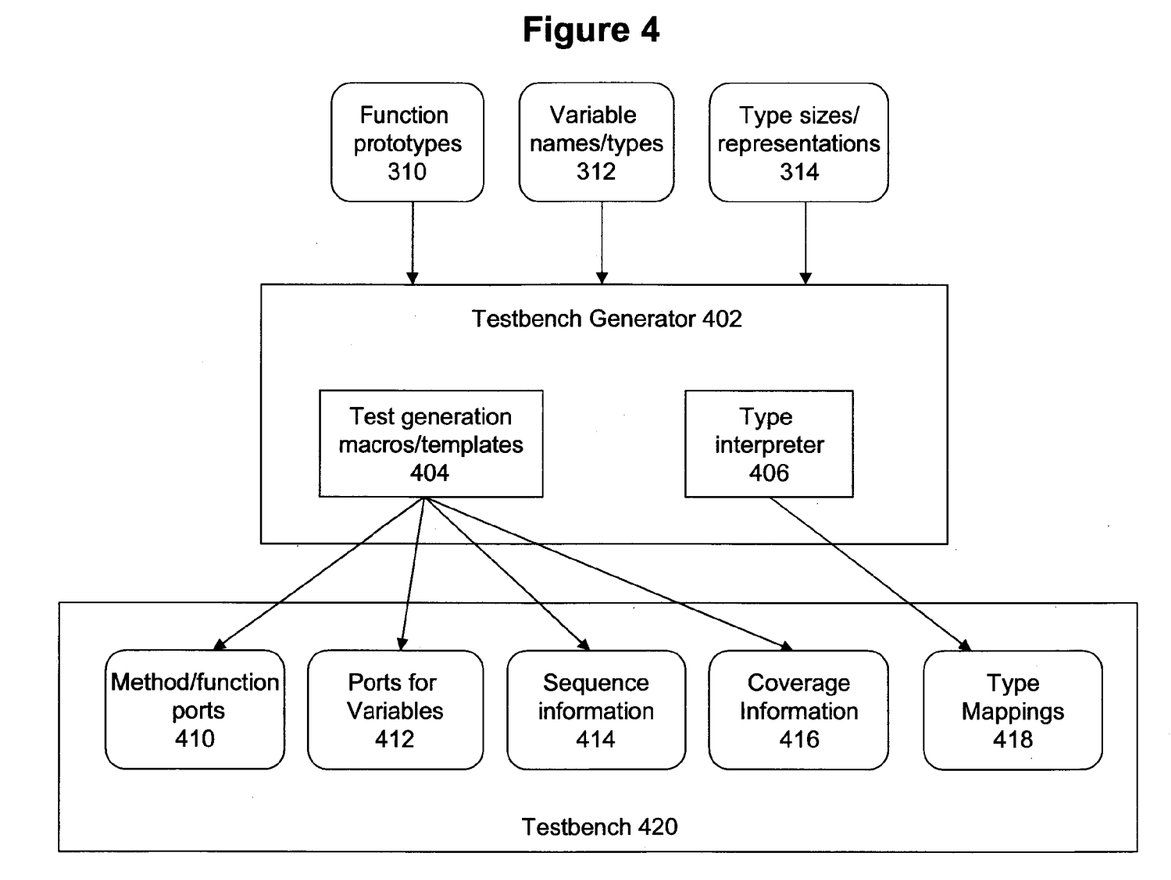
FIG. 4 shows a flowchart of a process for generating a verification test/environment according to some embodiments of the invention.

FIG. 4 shows a process for generating a verification test/environment according to some embodiments of the invention. The testbench generator 402 takes as input the function prototypes 310, variable names and types 312, and type size and representations 314 that were generated according to the process described in FIG. 3. The testbench generator 402 produces a testbench 420 that can be used by a verification tool to verify the software program.

In general, a verification tool used in conjunction with the invention will have a software adapter or interface logic to connect a verification environment to a design under verification (DUV). For example, the SPECMAN verification tool has software adapter logic to interface a verification environment written in the e language to a DUV that is written in another language.

The testbench 420 will include information and constructs that are appropriate to allow the software adapter/interface to operate with the software program being verified. In the present example, these information and constructs include method/function ports 410, ports 412 for variables, sequence information 414, coverage information 416, and type mappings 418. Type interpreter logic 406 is employed to generate the type mappings 418. According to some embodiments, macros and/or templates 404 can be used to generate the method/function ports 410, ports 412 for variables, sequence information 414, and coverage information 416.

Figure 5:
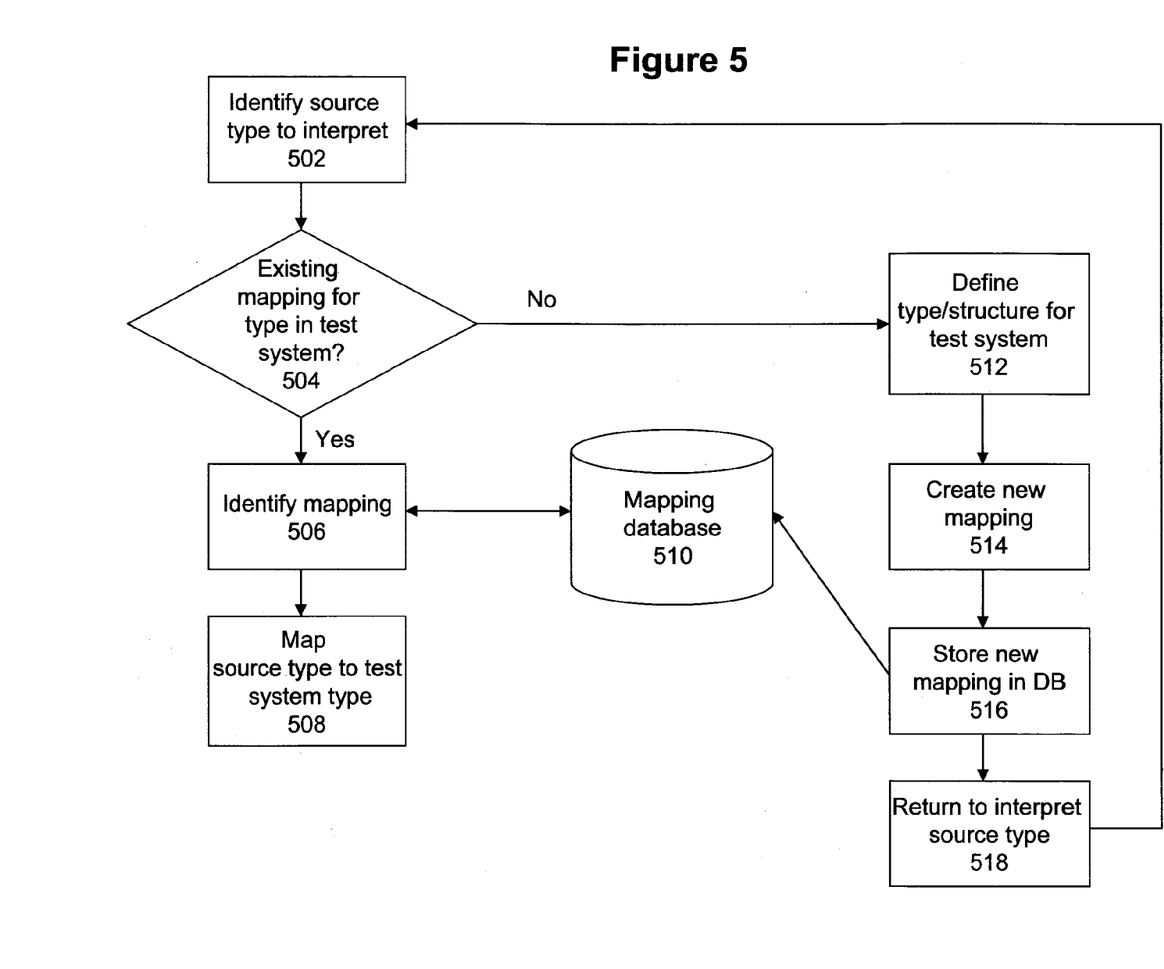
FIG. 5 shows a flowchart of a process for implementing type interpreter logic according to some embodiments of the invention.

FIG. 5 shows a flowchart of a process for implementing type interpreter logic according to some embodiments of the invention. The type interpreter logic performs interpretation of types between the language used in the source software program and the language used in the test system. For example, if the source code of the software program being tested is in the C programming language, then the type interpreter logic would provide interpretation of C types, including base types, typedefs, enumerations, and arrays and structures, and further including the understanding of the structure of C types in embedded software memory. The type interpreter logic would also perform mapping of the source language types to the test system language types. For example, if the test system uses the e language and the source software program is in the C language, then the type interpreter logic will perform mapping of e types to C types, including specification of which type pairs are allowable, and how mappings are performed. According to some embodiments, type creation and/or mapping can be automated by the system. For example, automation of e type creation can be performed based on C types, such as for enumerations and structures.

At 502, identification is made of the source language type that is to be interpreted. There are at least two categories of types that may need interpretation. A first category includes types which are already known to the test system and for which mapping to types in the test language exist within a mapping database 510. For example, it is likely that there are certain base types in the source language that directly correspond to base types in the test language, such as standard integer and character types. A second category of types includes types that are distinctive enough such that they would likely not have a direct correspondence to a known type within a mapping database 510. Examples of such types may include enumerated ("enum") types and structures ("struct").

At 504, a determination is made whether the source type that has been identified for interpretation corresponds to an existing mapping within the test system. If not, then at 512, a type/structure is defined for the test system which corresponds to the unrecognized source language type/structure. Conversion behaviors would be specified when defining the new type/structure. For example, when defining a new e language type to correspond to a C language enumerated type, the e language type could be defined with conversion behavior to have the same name and enumerator values as the C language enumerated type. As another example, when defining a new e language type to correspond to a C language struct type, the e language struct field names could be defined with conversion behavior to have the same struct member names as the C language struct type. The struct field types for the new e language type could be determined based upon their encoding in the debug information within the executable object file.

At 514, a new mapping could be created for the new test language type. The mapping would correspond, for example, an e language type to its equivalent C language type. At 516, the new mapping can then be stored within the mapping database 510. The process would then return back to 502 to select a source type to interpret (518).

If at 504 it was determined that source type identified for interpretation corresponds to an existing mapping within the test system, then that mapping is identified at 506 from the mapping database 510. For base types, this is likely to be automatically performed for base types recognized by both the source language and the test system language. For types that are not base types, this process can happen automatically as well if the type is recognized because it corresponds to a previous mapping that had been made and stored within the mapping database 510. Aliases may be specified for the mapping database 510 to assist in the identification and mapping of corresponding types (508).

Figure 6:
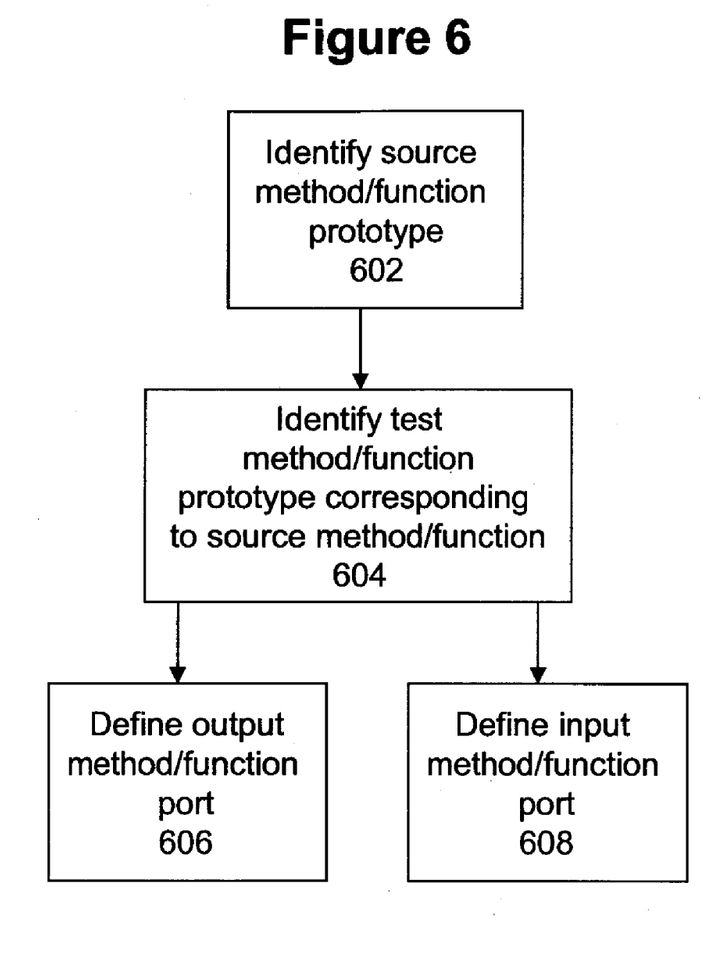
FIG. 6 is a flowchart of a process for implementing ports interface between method and functions according to some embodiments of the invention.
Figure 7:
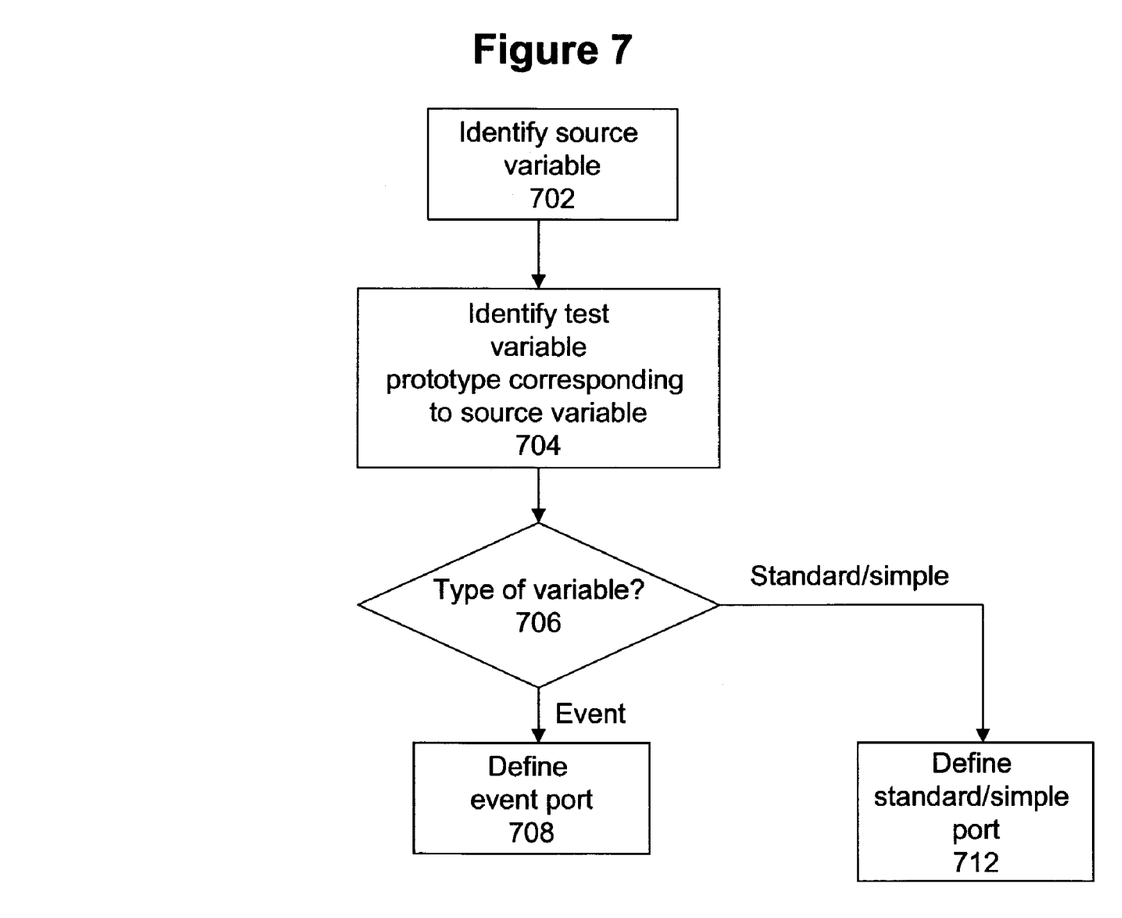
FIG. 7 is a flowchart of a process for implementing ports interface between variables according to some embodiments of the invention.

FIGS. 6 and 7 illustrate flowcharts of processes that can be employed to define ports that are used to interface between the source software language code and the test system language code. As shown in FIG. 2, a port is a construct that is used to exchange communications between the test program code and the software program under test in the source language code. Any suitable operating system or programmatic approach can be used to implements ports that allow communications from a first software program to a second software program.

FIG. 6 is a flowchart of a process for implementing ports interface between method and functions according to some embodiments of the invention. The port created by the process of FIG. 6 allows communications between the methods and functions in the source and test language codes.

At 602, identification is made of the source method/function prototype for the method or function of the software program under test for which a port is needed. This action utilizes the function prototypes 310 generated by the process of FIG. 3. Identification is made of the method or function within the test system code that needs to communicate with the function or method in the software program under test (604).

At 606, an output method port is defined that specifies both the method prototype in the test system code and function prototype in the software program under test. The prototypes are used to map method/function parameters between the call to the method in the test system code and the function in the software program under test. The output port is called from within the verification environment to exchange information and to interact with functions in the program under test.

At 608, an input method port is defined that specifies both the method prototype in the test system code and function prototype in the software program being tested. As before, the prototypes are used to map method/function parameters between the call to the method in the software program being tested and the method in the test system code in the verification environment. The input port is called from within the embedded software to return data or to interact with the test language code in the verification environment.

According to some embodiments, the output and input method ports of 606 and 608, respectively, are mutually exclusive alternatives, e.g., based on user preference. According to alternate embodiments, the output and input method ports may both be employed in conjunction with one another.

FIG. 7 is a flowchart of a process for implementing ports between variables according to some embodiments of the invention. The ports created by the process of FIG. 7 allow exchange and interaction between the variables in the software program being tested, e.g., the embedded software, and the variables in the test language code, e.g., the verification environment.

At 702, identification is made of the source variable in the software program being tested for which a port is needed. This action utilizes the variable names and types information 312 generated by the process of FIG. 3. Identification is made of the variables within the test system code that needs to interact or be exchanged with the source language code (704).

At 706, a determination is made of the variable type for which the port is needed. According to some embodiments, the variable could be an "event" variable or a non-event simple/standard variable. It is sometimes useful to be able to trigger an event based upon a change in a software variable. The event-type variable would be associated with event-type ports to allow the triggering of events.

If it is desired to be able to trigger events with the variable, then at 708, an event port is defined for the variable. As an example, consider if the software design has a variable or attribute called "edge( )" which has allowed values of "rise", "fall", or "change". Further assume that it is desirable to allow the value or transition of value for this attribute to trigger an event within the verification environment. In this situation, an event port would be defined that can be used to trigger events within the verification environment or the software program being tested, e.g., for coverage and checking.

If the variable is a standard or simple variable that is not to be used for triggering an event, then at 712, a standard/simple port is defined for the variable. This port provides, for example, sampling to be performed upon variables in the embedded software from within the verification environment. In addition, the port allows a variable in the verification environment to be sampled by the embedded software code.

Figure 8:
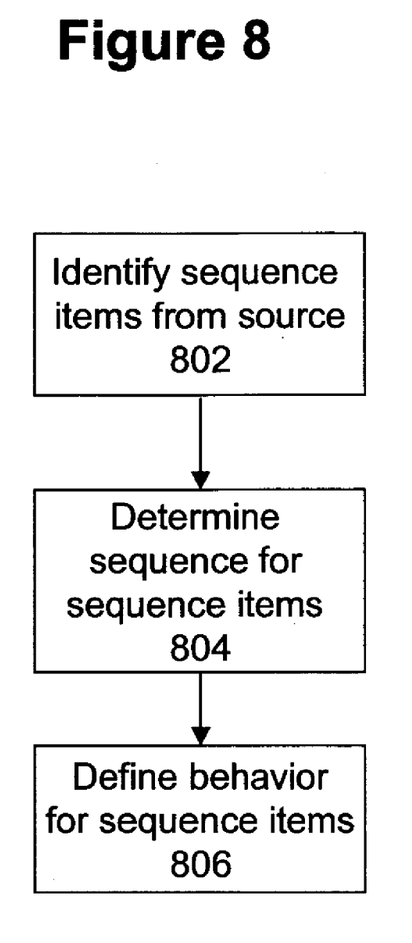
FIG. 8 describes a process for creating a software sequence environment according to some embodiments of the invention.

FIG. 8 describes a process for creating a software sequence environment according to some embodiments of the invention. For instance, given a set of functions, it may be desirable to configure the sequences in which those functions are called. As a simple example, to the extent the software program includes an "initialize" function to initialize the system, then it is likely to be desirable to make sure that this function is called at the start of processing before calling other substantive functions within the system. As another example, for the purpose of completeness in testing a software program, it may be desirable to implement several alternate sequences in which the functions within the software program are executed.

At 802, identification is made for one or more items from the embedded software for which it is desirable to impose a sequence. This action identifies, for example, functions from the embedded software for which it may be desirable or beneficial to associate or imply a sequence.

At 804, a determination is made of one or more sequences for the identified items from the embedded software. This action may be performed based upon the input from a user to select particular sequences of functions. In an alternate embodiment, this action may be performed automatically by the system to select one or more possible sequences based upon analysis of software code, based upon past activities or selections of the user, or based upon heuristics derived from past verification testing or other analysis factors.

At 806, a software sequence environment is defined for the sequence items, which enables the creation of stimulus sequences that call the software methods and accesses the software variables. For example, the software sequence items could include a sequence of e language methods that are called in order to provide a sequenced set of stimulus to the embedded software program.

Figure 9:
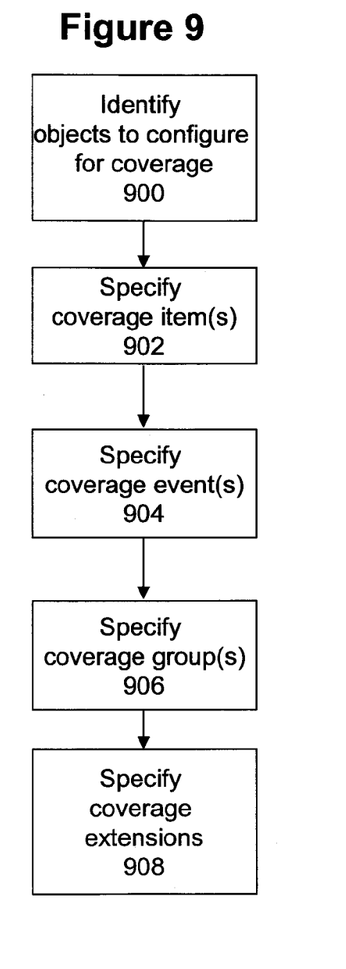
FIG. 9 shows a flowchart of a process for implementing coverage information for the verification environment, according to some embodiments of the invention.

FIG. 9 shows a flowchart of a process for implementing coverage information for the verification environment, according to some embodiments of the invention. The goal of the verification process to provide stimulus that gives complete coverage of the possible defect space for embedded software. According to some embodiments of the invention, coverage information can be used, for example, to configure and tune the type, range, and values of stimulus for verifying the embedded software.

At 900, identification is made of the objects for which it is desired to configure the coverage information or parameters. For example, this action can be used to identify method or method ports for which it is desired to configure coverage.

One or more coverage items are specified at 902. This action identifies the specific items for which it is desired to have coverage upon. For example, the value of specific variables may be defined as items for which it is desired to impose coverage upon.

At 904, one or more coverage "events" may be specified. This provides an event or temporal basis for checking coverage. For example, assume that it is desired to check the value of a particular variable at a given point in time. A coverage event may be configured to check that variable value at the designated point in time.

As another example, if the coverage event is associated with a method port, then the coverage event emits when the method port is accessed or called. As another example, if the method port has a coverable return type, then the coverage event emits when the method port returns.

One or more coverage groups may also be defined for the identified item (906). The coverage group is an approach for imposing a grouping upon a set of coverage items. In an embodiment, the coverage group and event are defined to contain as many items as coverable port parameters.

At 908, additional coverage may be specified for the identified method. For example, a range of values can be defined for a method port. The specified range of values would be used to generate stimulus for the verification of the embedded software.

According to one embodiment, the mechanisms and processes described with respect to FIGS. 6-9 for generating method/function ports, ports for variables, sequence information, and coverage information may be implemented using macros and/or templates. According to this embodiment, the macro and/or template provides an efficient and streamlined approach for implementing the structure of method/function ports, ports for variables, sequence information, and coverage information.

System Architecture Overview

Figure 10:
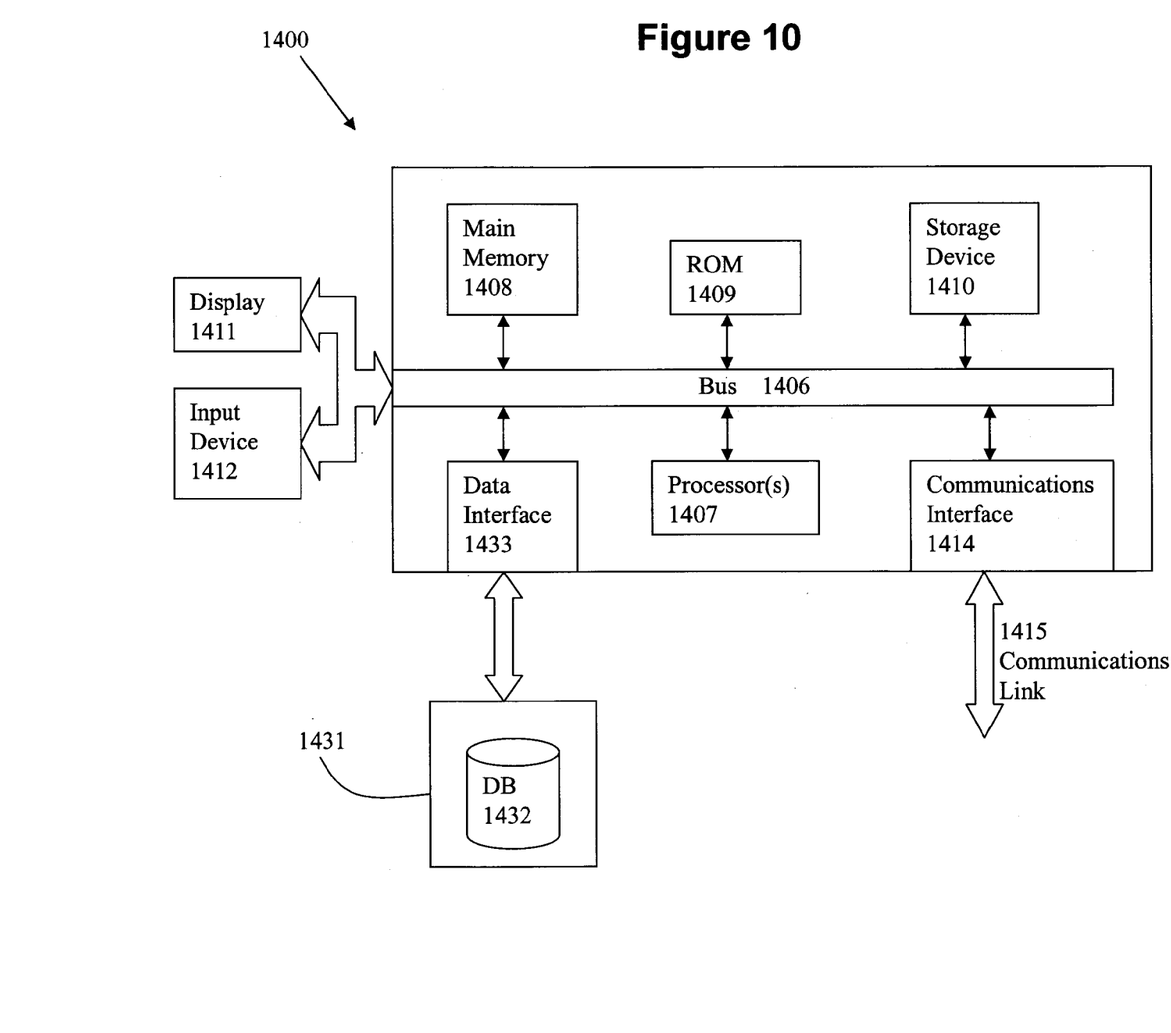
FIG. 10 shows architecture of an example computing system with which the invention may be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), data interface 1433 and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive (1410, 1431, or 1432). Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for verifying software, comprising:
using at least one processor to perform a process, the process comprising:
identifying object code that was generated from compilation of one or more source code files,
the one or more source code files corresponding to a software program to be verified,
the one or more source code files being in at least a first programming language,
the one or more source code files comprising functions and variables that have been defined using the first programming language, and
the object code corresponding to compiled versions of the functions and variables;
analyzing the object code to identify program information relevant to verification of the software program by at least extracting debugging information from the object code rather than using a co-debugging process that is tied to execution of the software program, the program information comprising information that is machine-specific to a hardware device on which the software program is to execute; and
generating a testbench based at least in part upon the program information from the object code that is relevant to verification of the software program, wherein
an event port that is to trigger an event is defined to correspond to a first variable in the testbench with a second variable in the software program, and
the testbench is usable by a verification tool to perform coverage driven verification to verify the software program.

2. The method of claim 1 in which the program information analyzed from the object code comprises function prototype information, variable names, variable types, type sizes, or type representations.

3. The method of claim 1 in which the program information analyzed from the object code comprises machine-specific information based at least in part upon compilation of the source code files, the machine-specific information not identifiable directly from the source code files in the first programming language.

4. The method of claim 1 in which a debug information parser is used to extract the program information from the object code.

5. The method of claim 1 in which coverage information is generated to implement the coverage driven verification, the coverage information based at least in part upon the program information analyzed from the object code.

6. The method of claim 5 in which the coverage information comprises specification of a coverage item, coverage event, coverage group, or coverage extension.

7. The method of claim 1 in which a port is defined to facilitate communications between the testbench and the software program.

8. The method of claim 1 in which an input port or an output port is used to facilitate communications between methods or functions.

9. The method of claim 1 in which the testbench imposes a sequence behavior.

10. The method of claim 1 in which type mapping is performed to correspond a first type in the testbench with a second type in the software program.

11. The method of claim 10 in which type mapping is automatically performed if a mapping already exists for the first and second types.

12. The method of claim 1 in which the software program comprises embedded software or firmware.

13. The method of claim 1 in which co-verification is performed to verify the software program along with a hardware design.

14. The method of claim 1 in which the testbench is implemented using a second programming language, the second programming language being different from the first programming language.

15. A computer program product comprising a non-transitory computer readable medium having stored thereupon executable code which, when executed by at least one processor, causes the at least one processor to execute a process for verifying software program, the process comprising:
identifying object code that was generated from compilation of one or more source code files,
the one or more source code files corresponding to a software program to be verified,
the one or more source code files comprising functions and variables that have been defined using the first programming language, and
the object code corresponding to compiled versions of the functions and variables;
analyzing the object code to identify program information relevant to verification of the software program by at least extracting debugging information from the object code rather than using a co-debugging process that is tied to execution of the software program, the program information comprising information that is machine-specific to a hardware device on which the software program is to execute; and
generating a testbench based at least in part upon the program information from the object code that is relevant to verification of the software program, wherein
an event port that is to trigger an event is defined to correspond to a first variable in the testbench with a second variable in the software program, and
the testbench is usable by a verification tool to perform coverage driven verification to verify the software program.

16. The product of claim 15, in which the program information analyzed from the object code comprises machine-specific information, function prototype information, variable names, variable types, type sizes, or type representations.

17. The product of claim 15 in which co-verification is performed to verify the software program along with a hardware design, in which the software program comprises embedded software or firmware.

18. A system for verifying software, comprising:
a verification tool having a processor to perform verification upon a software program written in a first programming language; and
a module that is to generate a testbench based at least in part upon the program information that is determined from object code that was generated from compilation of one or more source code files, wherein
the one or more source code files corresponds to the software program to be verified, the one or more source code files comprise functions and variables that have been defined using the first programming language, the object code corresponds to compiled versions of the functions and variables, the testbench is generated based at least in part upon program information by at least extracting debugging information from the object code rather than using a co-debugging tool that is tied to execution of the software program, an event port that is to trigger an event is defined to correspond to a first variable in the testbench with a second variable in the software program, the program information comprises information that is machine-specific to a hardware device on which the software program is to execute, and the verification tool utilizes the testbench to perform coverage driven verification to verify the software program.

19. The system of claim 18 in which the program information analyzed from the object code comprises function prototype information, variable names, variable types, type sizes, or type representations.

20. The system of claim 18 in which the program information analyzed from the object code comprises machine-specific information based at least in part upon compilation of the source code files, the machine-specific information not identifiable directly from the source code files in the first programming language.

21. The system of claim 18 in which a port is defined to facilitate communications between the testbench and the software program.

22. The system of claim 18 in which the testbench imposes a sequence behavior.

23. The system of claim 18 in which type mapping is performed to correspond a first type in the testbench with a second type in the software program.

24. The system of claim 18 in which the software program comprises embedded software or firmware.

25. The system of claim 18 in which co-verification is performed to verify the software program along with a hardware design.

26. The system of claim 18 in which the testbench is implemented using a second programming language, the second programming language being different from the first programming language.

\* \* \* \* \*